United States Patent
Zhao

(10) Patent No.: US 10,832,466 B2
(45) Date of Patent: Nov. 10, 2020

(54) VIEW-DEPENDENT STOCHASTIC VOLUME RENDERING WITH MONTE CARLO RAY EXPLORATION

(71) Applicant: INTERNATIONAL BUSINESS MACHINES CORPORATION, Armonk, NY (US)

(72) Inventor: Kun Zhao, Funabashi (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/170,598

(22) Filed: Oct. 25, 2018

(65) Prior Publication Data
US 2020/0134904 A1 Apr. 30, 2020

(51) Int. Cl.
*G06T 15/06* (2011.01)

(52) U.S. Cl.
CPC .................. *G06T 15/06* (2013.01)

(58) Field of Classification Search
CPC ..... G06T 2210/41; G06T 15/08; G06T 15/06; G06T 2207/10072; G06T 2211/424; G06T 11/008; G06T 2200/04; G06T 15/506; G06T 7/0002; G06T 15/205; G06T 2207/10028; G06T 2207/10116; G06T 5/50; G06T 2200/08; G06F 3/011
See application file for complete search history.

(56) References Cited

U.S. PATENT DOCUMENTS

| 2003/0016218 A1* | 1/2003 | Zwicker | G06T 15/04 345/424 |
| 2004/0125103 A1* | 7/2004 | Kaufman | G06T 15/06 345/419 |
| 2017/0109935 A1 | 4/2017 | Löffler et al. | |
| 2017/0294042 A1 | 10/2017 | Engel | |
| 2018/0225861 A1* | 8/2018 | Petkov | G06T 15/08 |

FOREIGN PATENT DOCUMENTS

WO 2017039664 3/2017

OTHER PUBLICATIONS

Noahisa Sakamoto et al., Improvement of particle-based volume rendering for visualizing irregular volume data sets, Computers & Graphics 34, Feb. 2010, 34-42.

Christof Rezk Salama, GPU-Based Monte-Carlo volume Raycasting, 15th Pacific Conference on Computer Graphics and Applications (PG'07), Maui, HI, Oct. 2007, pp. 411-414.

* cited by examiner

*Primary Examiner* — Xilin Guo
(74) *Attorney, Agent, or Firm* — Tutunjian & Bitetto,, P.C.; Randall Bluestone

(57) ABSTRACT

Methods and systems for data visualization include comparing a random value to opacity values along a plurality of rays to determine a stopping point for each ray in a three-dimensional dataset. An expected brightness is determined for each ray based on a brightness value at the stopping point of each ray. An image is generated that visualizes the three-dimensional dataset based on the expected brightness for each ray.

19 Claims, 6 Drawing Sheets

VIEW-DEPENDENT STOCHASTIC VOLUME RENDERING WITH MONTE CARLO RAY EXPLORATION

BACKGROUND

Technical Field

The present invention generally relates to visualization of volumetric data and, more particularly, to Monte Carlo ray tracing.

Description of the Related Art

The visualization of data in three dimensions is a computationally intensive problem, particularly for large datasets. Existing approaches attempt to reduce the data into "particles" and renders the particles instead of the original data. The particles can then be rendered more efficiently, but at the cost of image quality. Furthermore, the step of calculating the particles incurs its own overhead.

SUMMARY

A method for data visualization include comparing a random value to opacity values along a plurality of rays to determine a stopping point for each ray in a three-dimensional dataset. An expected brightness is determined for each ray based on a brightness value at the stopping point of each ray. An image is generated that visualizes the three-dimensional dataset based on the expected brightness for each ray.

A method for data visualization includes transforming a three-dimensional dataset along a plurality of rays to form a matrix, where each ray is represented as row of the matrix, such that each ray has a plurality of samples from the three-dimensional dataset. Each sample includes an opacity value and a brightness value. A random value is sequentially compared to opacity values along each of the plurality of rays in order of increasing distance from a shared observation point until the random value is lower than the opacity value of a given sample to determine a stopping point for each ray in the transformed three-dimensional dataset. An expected brightness is determined for each ray based on a brightness value at the stopping point of each ray. The sequential comparison and the determination are iterated for each of the plurality of rays until a maximum number of iterations has been reached. Determining the expected brightness for each ray at each iteration includes combining an expected brightness determined at a previous iteration with the brightness value of the stopping point of each ray for a current iteration. An image is generated that visualizes the three-dimensional dataset based on the expected brightness for each ray.

A system for data visualization includes a projection module configured to compare a random value to opacity values along a plurality of rays to determine a stopping point for each ray in a three-dimensional dataset. A brightness module is configured to determine an expected brightness for each ray based on a brightness value at the stopping point of each ray. A visualization module is configured to generate an image that visualizes the three-dimensional dataset based on the expected brightness for each ray.

A system for data visualization includes a transform module configured to transform a three-dimensional dataset along a plurality of rays to form a matrix. Each ray is represented as row of the matrix, such that each ray has a plurality of samples from the three-dimensional dataset. Each sample includes an opacity value and a brightness value. A projection module is configured to sequentially compare a random value to opacity values along each of the plurality of rays in order of increasing distance from a shared observation point until the random value is lower than the opacity value of a given sample to determine a stopping point for each ray in the transformed three-dimensional dataset. A brightness module is configured to determine an expected brightness for each ray based on a brightness value at the stopping point of each ray. The projection module and the brightness module are configured to iterate the sequential comparison and the determination for each of the rays until a maximum number of iterations has been reached. The brightness module is further configured to combine an expected brightness determined at a previous iteration with the brightness value of the stopping point of each ray for a current iteration. A visualization module is configured to generate an image that visualizes the three-dimensional dataset based on the expected brightness for each ray.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide Monte Carlo ray tracing to visualize data in three dimensions. This provides very rapid results that can be refined with additional processing. The result provides higher-quality images than particle-based methods and provides results much more quickly than conventional ray tracing.

The "Monte Carlo" methods of the present embodiments treat opacity as a probability of a particular ray being stopped at a particular point. Ray tracing is performed with this probabilistic measurement and is repeated over a number of iterations, until either a determined "brightness" converges on a particular value or until the number of iterations exceeds some threshold. In this manner, the level of image quality can be balanced against the amount of time needed to generate the image. In general terms, a "Monte Carlo" process is one that employs repeated use of random samples to model some underlying process or structure. The present embodiments use a Monte Carlo approach to ray tracing to avoid the burdensome calculation that would otherwise be needed to determine visibility of various points, thereby substantially reducing the computational burden of rendering the visualization at the expense of some image quality.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 1:
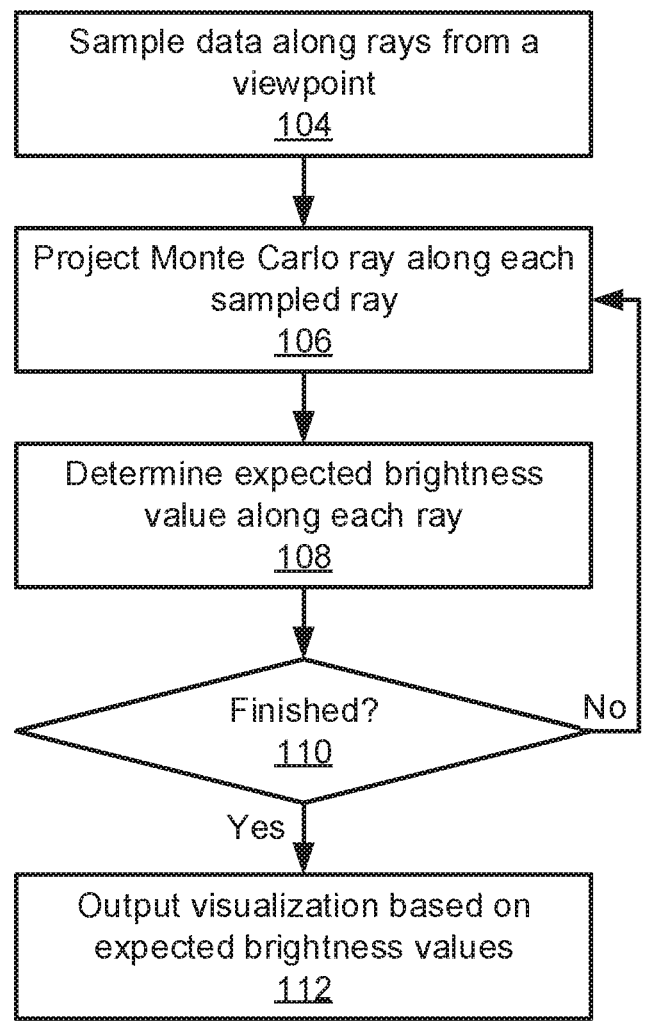
FIG. 1 is a block/flow diagram of a method of visualizing volume data using Monte Carlo ray projection in accordance with an embodiment of the present invention.

Referring now to FIG. 1, a method for visualizing data using Monte Carlo ray tracing is shown. Block 104 samples input volume data along a set of rays that emanate from an origin point. This sampling effectively converts the coordinates of the input data into spherical coordinates, where each sampled point represents a piece of solid angle located a certain radius from an observation point. For each sampling point, the value is interpolated based on the original volume data. The value of each sample can be stored in a matrix data structure, where each row represents a single ray and each column represents a distance from the origin. The distance from one column to the next can be a constant value, such that the first sample on each ray is measured a distance d from the observation point, the second sample on each ray is measured a distance 2d from the observation point, and so on. In some embodiments, the first column can have a larger distance from the observation point than the distance between subsequent columns. In an alternative embodiment, instead of being uniformly spaced, the points can be sampled randomly or with varying densities (e.g., with a higher sample density close to the observation point).

Thus each value in the matrix identifies a point in space, with corresponding values. The transfer function can transfer each value in the matrix to an opacity and a brightness. Opacity governs how likely a ray projection is to pass through the point, while brightness can represent any visualizable transform of the input data, for example assigning a "color" to the point to be used during visualization. This transformation to a discretely sampled set of rays can substantially decrease the size of the data being handled. It should be understood that this transfer can be performed according to any appropriate transfer function that interprets the input data and finds an appropriate opacity value between 0% and 100% that corresponds to the input data. The brightness value can similarly represent the input data in any appropriate way. The transfer function can be expressed generally as a function $f(s)$, where s is the scalar value of a datapoint and the output is the color (e.g., an RGB value) and an opacity.

Block 106 projects a Monte Carlo ray along each sampled ray. This is performed by treating the opacity values as probabilities that the ray will stop at a given point. The Monte Carlo ray projection is described in greater detail below. Block 108 uses the brightness and opacity values for each point at which Monte Carlo rays stop, determining an updated expected brightness value for each ray. In particular, block 108 calculates an expected brightness at each iteration as:

$$B_{expected} = B_{prev} + \frac{1}{N}(B_{curr} - B_{prev})$$

where $B_{prev}$ is the expected brightness value for the previous iteration (and is zero in the first iteration), $B_{curr}$ is the brightness value of the point where the current Monte Carlo ray stopped, and N is the number of projections performed so far. Thus, $B_{expected}$ updates at each iteration with the information provided by the most recent Monte Carlo projection. By using the Monte Carlo approach to ray projection, visibility sorting can be omitted and a substantial amount of time can be saved over conventional ray tracing.

In some embodiments, the application of the transfer function can be omitted. In such an embodiment, the data values can be used directly to evaluate the Monte Carlo ray projections. In this case, the random value of the Monte Carlo projection in block 106 is compared to the data values of the various sampled points themselves to determine where the ray projection stops.

Block 110 determines whether additional Monte Carlo projections should be performed. This can be performed on a per-ray basis, for example by determining that the value for $B_{expected}$ has converged. Alternatively, block 110 can stop iterating after a predetermined number of iterations has been performed. In some embodiments, individual rays that have converged are omitted in subsequent iterations too save processing time, while the other rays continue to iterate until they either converge themselves or until the maximum number of iterations has been reached.

In one specific embodiment, iterations can stop when an iteration finds the last point along a ray. The rationale for this is that the last point will have the lowest likelihood of being reached, as each previous point will need to be tested first. Thus, once the last point has been evaluated, it is a reasonable approximation to assume that the other points on the ray have been evaluated a sufficient number of times. This has the advantage of shortening the amount of time needed to evaluate rays having a low overall opacity, as those rays will have a higher likelihood of reaching the last point.

Once block 110 determines that no further iterations are to be performed, block 112 outputs a visualization that is based on the expected brightness values along each ray. As the number of iterations increases, the expected brightness values converge to what they would be in a conventional ray tracing system. The result generally provides an image with higher quality than particle-based renderings, and does so substantially faster.

Although the present embodiments are described with serial, iterative processing, it should be understood that the embodiments can instead be performed in parallel by a distributed computing system to increase performance. For example, the rays can be grouped in batches of one or more rays and divided between different processing sites. Additionally, multiple iterations can be performed at once, with the resultant brightness values being collected at the end to determine the expectation value. The processing speed can thereby be increased arbitrarily, with one embodiment performing each iteration of each ray simultaneously on a separate processing device.

In embodiments that employ distributed processing to perform multiple iterations in parallel, the brightness value resulting from each iteration is output to a central location. The process of block 108 can either be performed on the set of pre-computed brightness values or can simply average the values to generate he expected brightness value.

Figure 2:
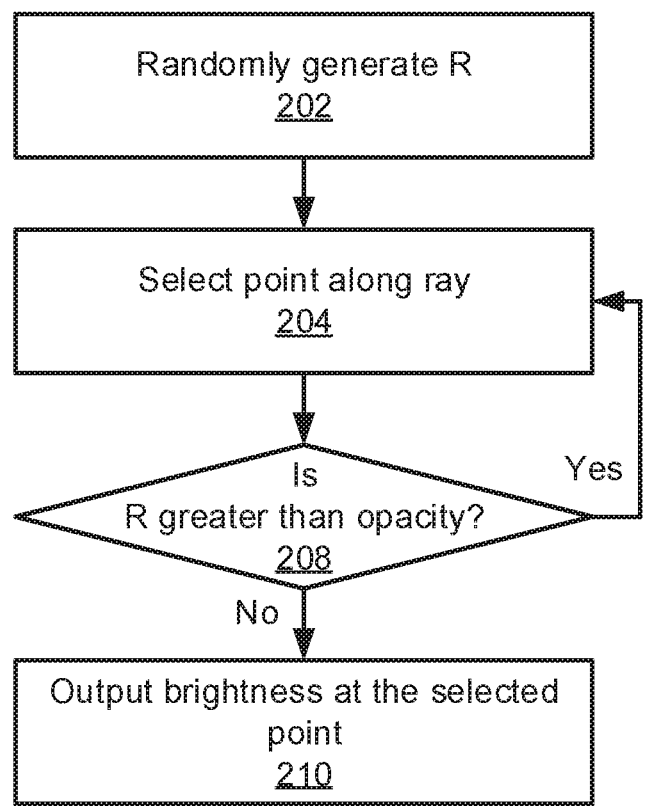
FIG. 2 is a block/flow diagram of a method of projecting a randomly generated value along a ray to determine a brightness value in an iteration of a Monte Carlo ray projection method in accordance with an embodiment of the present invention.

Referring now to FIG. 2, additional detail on the projection of Monte Carlo rays in block 106 is shown. Block 202 randomly generates a number R between 0 and 1. Block 204 selects a first point in the ray, for example the column of the data structure that represents the point closest to the point of observation. Block 208 determines whether the value of R exceeds the opacity value for the selected point. If so, processing returns to block 204 and another point is selected.

This process continues until either block 208 determines that the value of R is lower than the opacity for a point on the ray or there are no further points in the ray. Block 210 then outputs the brightness of the selected point. If the projection reaches the end of the ray without being stopped at any point, then the current brightness $B_{curr}$ can be set to zero for the iteration.

The quality of the final rendering will depend on the number of iterations for each ray. In one experiment, using a volume measuring 100×100×100 datapoints to visualize the energy levels of hydrogen, the image quality for renderings based on various numbers of iterations are compared to one another and to a visualization based on particle rendering in Table 1. The table compares the root mean-square error (RMSE) and the peak signal-to-noise ratio (PSNR) of the visualizations generated in each case, as compared to a conventional ray tracing visualization. Lower values of RMSE and higher values of PSNR represent closer matches to the conventional ray tracing visualization.

TABLE 1

|  | RMSE | PSNR |
|---|---|---|
| Monte Carlo, N = 1 | 4.32 | 40.21 |
| Monte Carlo, N = 3 | 3.31 | 42.52 |
| Monte Carlo, N = 10 | 2.46 | 45.12 |
| Monte Carlo, N = 50 | 1.65 | 48.61 |
| Particle rendering | 5.17 | 38.67 |

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
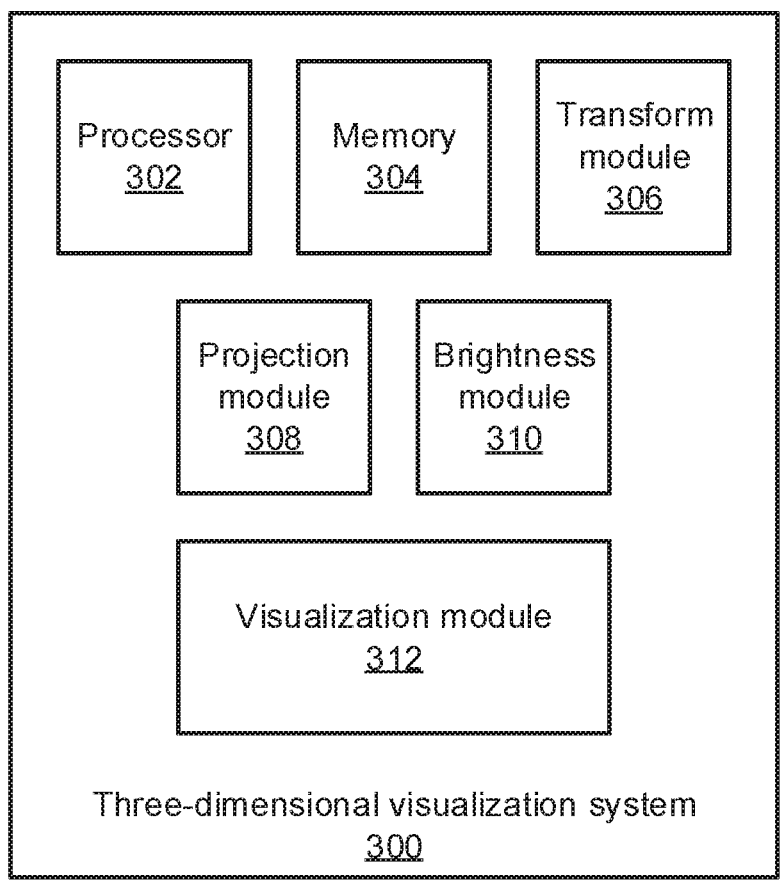
FIG. 3 is a block diagram of a three-dimensional visualization system that visualizes volume data using Monte Carlo ray projection in accordance with an embodiment of the present invention.

Referring now to FIG. 3, a three-dimensional visualization system 300 is shown. The system 300 includes a hardware processor 302 and memory 304. The system 300 also includes one or more functional modules that may each by implemented as software that is stored in the memory 304 and that is executed by the hardware processor 302. One or more of the functional modules may alternatively be implemented as one or more discrete hardware components in the form of application-specific integrated chips or field programmable gate arrays.

A transform module 306 operates on a set of input data to transform the data to opacity and brightness values. The transform module 306 samples the data along a set of rays, each starting from a shared observation point in a volume that includes the data. The output of the transform module 306 may be a matrix data structure that includes a set of rows that each represent individual rays, with each value of each row representing a sample at a respective distance from the observation point.

Projection module 308 performs Monte Carlo projections along each ray by determining a random number at each iteration and comparing the random number to the opacity value of each sample until the comparison indicates that the ray stops. The brightness value at the sample where the ray stops is used by the brightness module 310 to update an expected brightness for each ray. The projection module 308 continues to project rays in this manner until either a maximum number of iterations has been reached or the expected brightness value converges. A visualization module 312 then uses an expected brightness value for each ray to generate an image that visualizes the data as seen from the observation point.

Figure 4:
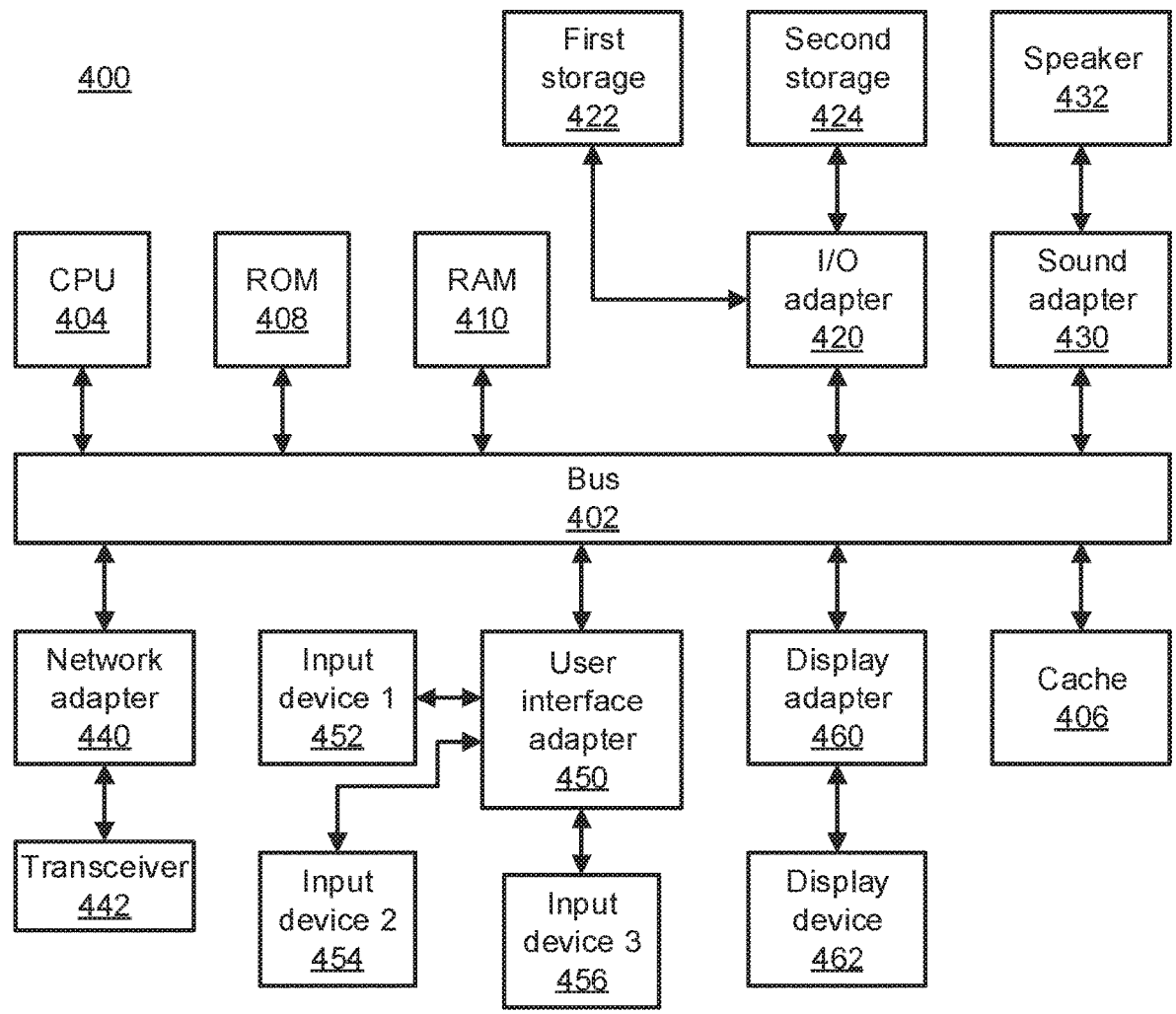
FIG. 4 is a block diagram of a processing system in accordance with an embodiment of the present invention.

Referring now to FIG. 4, an exemplary processing system 400 is shown which may represent the transmitting device 100 or the receiving device 120. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Figure 5:
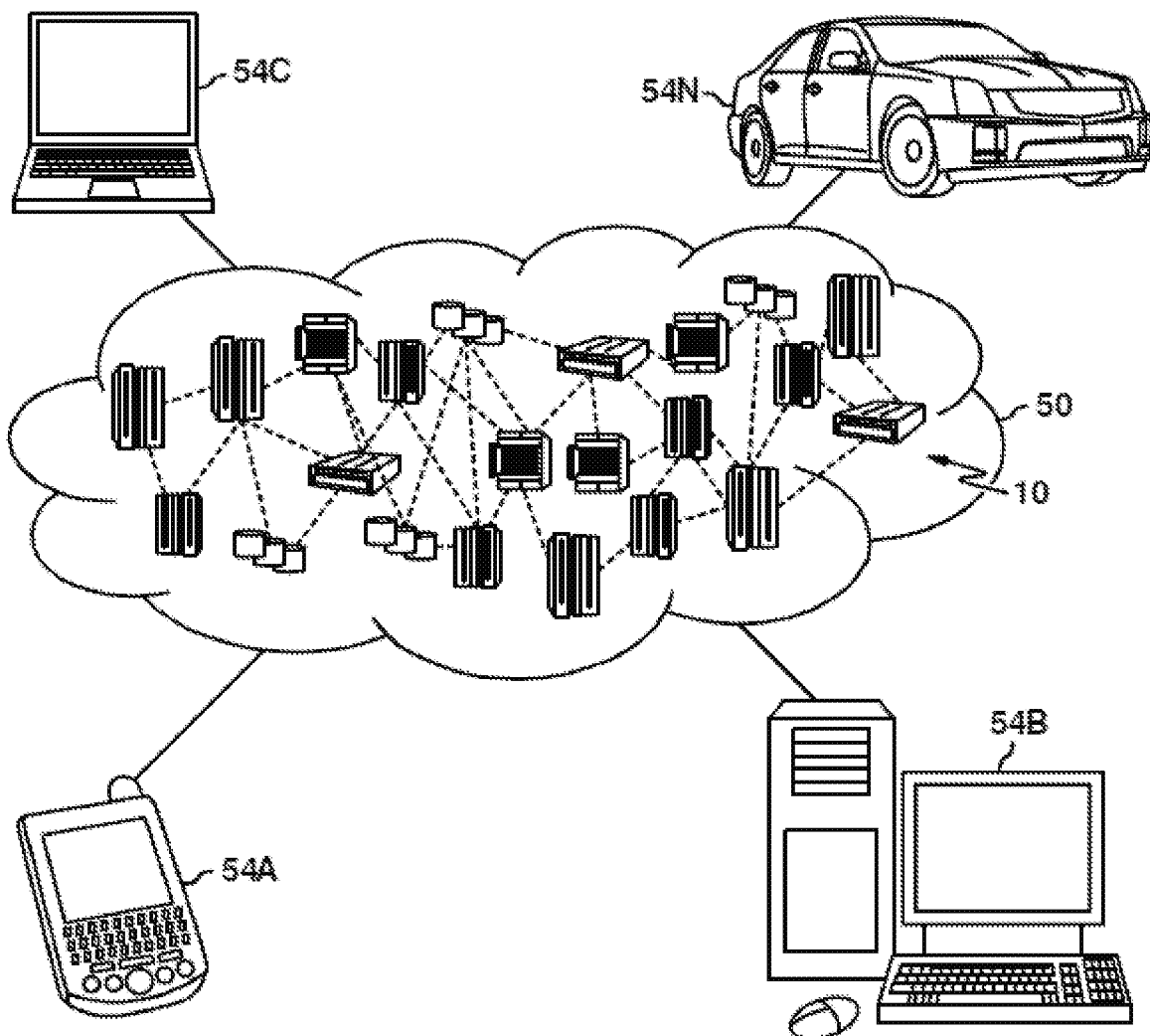
FIG. 5 is a diagram of a cloud computing environment according to the present principles.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
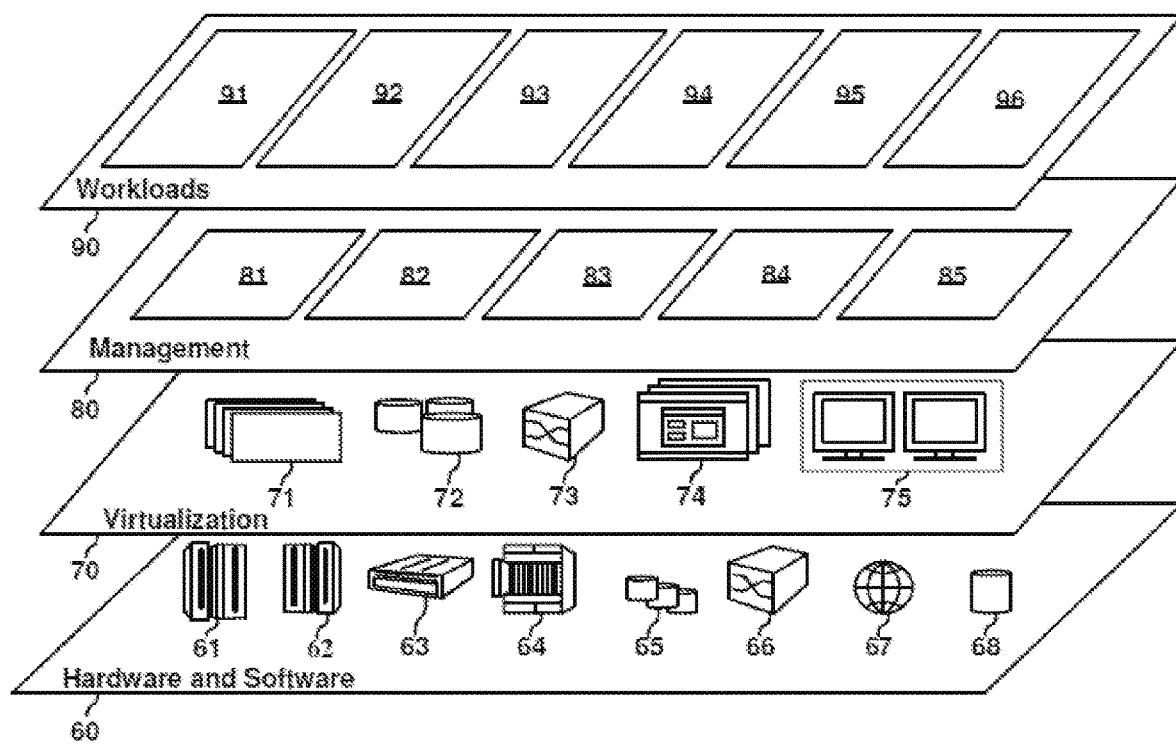
FIG. 6 is a diagram of abstraction model layers according to the present principles.

Referring now to FIG. 6, a set of functional abstraction layers provided by cloud computing environment 50 (FIG. 5) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and three-dimensional volume visualization 96.

Having described preferred embodiments of view-dependent stochastic volume rendering with Monte Carlo ray exploration (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for data visualization, comprising:
   comparing a random value to opacity values along a plurality of rays to determine a stopping point for each ray in a three-dimensional dataset;
   determining an expected brightness for each ray based on a brightness value at the stopping point of each ray;
   generating an image that visualizes the three-dimensional dataset based on the expected brightness for each ray; and
   transforming the three-dimensional dataset along the plurality of rays, such that each ray comprises a plurality of samples from the three-dimensional dataset, with each sample comprising an opacity value and a brightness value,
   wherein the rays are represented as rows of a matrix, with each column of a matrix representing a respective distance from a shared observation point, and
   wherein comparing the random value to the opacity values along the plurality of rays comprises sequentially comparing the random value to the opacity value of each sample in order of increasing distance from the shared observation point until the random value is lower than the opacity value of a given sample and determining the given sample to be the stopping point of the ray.

2. The computer-implemented method of claim 1, further comprising iterating the comparing and determining step for each of the plurality of rays until a maximum number of iterations has been reached.

3. The computer-implemented method of claim 2, wherein determining the expected brightness for each ray at each iteration comprises combining an expected brightness determined at a previous iteration with the brightness value of the stopping point of each ray for a current iteration.

4. The computer-implemented method of claim 3, wherein the expected brightness for each ray at each iteration is determined as:

$$B_{expected} = B_{prev} + \frac{1}{N}(B_{curr} - B_{prev})$$

where $B_{prev}$ is the expected brightness value for the previous iteration, $B_{curr}$ is the brightness value of the stopping point of the current iteration, and N is the number of iterations performed so far.

5. The computer-implemented method of claim 2, wherein a different random value is generated for each iteration.

6. The computer-implemented method of claim 1, wherein comparing is performed in a distributed fashion, with subsets of the plurality of rays being processed at different respective processing nodes.

7. The computer-implemented method of claim 1, wherein comparing is performed multiple times in a distributed fashion, with said comparing being repeated at different respective processing nodes with different random values.

8. A non-transitory computer readable storage medium comprising a computer readable program for data visualization, wherein the computer readable program when executed on a computer causes the computer to perform the steps of:
comparing a random value to opacity values along a plurality of rays to determine a stopping point for each ray in a three-dimensional dataset;
determining an expected brightness for each ray based on a brightness value at the stopping point of each ray;
generating an image that visualizes the three-dimensional dataset based on the expected brightness for each ray; and
transforming the three-dimensional dataset along the plurality of rays, such that each ray comprises a plurality of samples from the three-dimensional dataset, with each sample comprising an opacity value and a brightness value,
wherein the rays are represented as rows of a matrix, with each column of a matrix representing a respective distance from a shared observation point, and
wherein comparing the random value to the opacity values along the plurality of rays comprises sequentially comparing the random value to the opacity value of each sample in order of increasing distance from the shared observation point until the random value is lower than the opacity value of a given sample and determining the given sample to be the stopping point of the ray.

9. A computer-implemented method for data visualization, comprising:
transforming a three-dimensional dataset along a plurality of rays to form a matrix, where each ray is represented as row of the matrix, such that each ray comprises a plurality of samples from the three-dimensional dataset, with each sample comprising an opacity value and a brightness value;
sequentially comparing a random value to opacity values along each of the plurality of rays in order of increasing distance from a shared observation point until the random value is lower than the opacity value of a given sample to determine a stopping point for each ray in the transformed three-dimensional dataset;
determining an expected brightness for each ray based on a brightness value at the stopping point of each ray;
iterating said sequential comparison and said determination for each of the plurality of rays until a maximum number of iterations has been reached, wherein determining the expected brightness for each ray at each iteration comprises combining an expected brightness determined at a previous iteration with the brightness value of the stopping point of each ray for a current iteration; and
generating an image that visualizes the three-dimensional dataset based on the expected brightness for each ray.

10. The computer-implemented method of claim 9, wherein the expected brightness for each ray at each iteration is determined as:

$$B_{expected} = B_{prev} + \frac{1}{N}(B_{curr} - B_{prev})$$

where $B_{prev}$ is the expected brightness value for the previous iteration, $B_{curr}$ is the brightness value of the stopping point of the current iteration, and N is the number of iterations performed so far.

11. A system for data visualization, comprising:
a projection module comprising a processor configured to compare a random value to opacity values along a plurality of rays to determine a stopping point for each ray in a three-dimensional dataset;
a brightness module configured to determine an expected brightness for each ray based on a brightness value at the stopping point of each ray;
a visualization module configured to generate an image that visualizes the three-dimensional dataset based on the expected brightness for each ray; and
a transform module configured to transform the three-dimensional dataset along the plurality of rays, such that each ray comprises a plurality of samples from the three-dimensional dataset, with each sample comprising an opacity value and a brightness value,
wherein the rays are represented as rows of a matrix, with each column of a matrix representing a respective distance from a shared observation point, and
wherein the projection module is further configured to sequentially compare the random value to the opacity value of each sample in order of increasing distance from the shared observation point until the random value is lower than the opacity value of a given sample and to determine the given sample to be the stopping point of the ray.

12. The system of claim 11, wherein the projection module and the brightness module are further configured to iterate comparison and determination for each of the plurality of rays until a maximum number of iterations has been reached.

13. The system of claim 12, wherein the brightness module is further configured to combine an expected brightness determined at a previous iteration with the brightness value of the stopping point of each ray for a current iteration.

14. The system of claim 13, wherein the expected brightness for each ray at each iteration is determined as:

$$B_{expected} = B_{prev} + \frac{1}{N}(B_{curr} - B_{prev})$$

where $B_{prev}$ is the expected brightness value for the previous iteration, $B_{curr}$ is the brightness value of the stopping point of the current iteration, and N is the number of iterations performed so far.

15. The system of claim 12, wherein a different random value is generated for each iteration.

16. The system of claim 11, wherein the projection module is configured to distribute the performance of the comparison across multiple processing nodes, with subsets of the plurality of rays being processed at different respective processing nodes.

17. The system of claim 11, wherein the projection module is configured to distribute the performance of the comparison across multiple processing nodes, repeating said comparison at different respective processing nodes with different random values.

18. A system for data visualization, comprising:
- a transform module configured to transform a three-dimensional dataset along a plurality of rays to form a matrix, where each ray is represented as row of the matrix, such that each ray comprises a plurality of samples from the three-dimensional dataset, with each sample comprising an opacity value and a brightness value;
- a projection module comprising a processor configured to sequentially compare a random value to opacity values along each of the plurality of rays in order of increasing distance from a shared observation point until the random value is lower than the opacity value of a given sample to determine a stopping point for each ray in the transformed three-dimensional dataset;
- a brightness module configured to determine an expected brightness for each ray based on a brightness value at the stopping point of each ray, wherein said projection module and said brightness module are configured to iterate said sequential comparison and said determination for each of the plurality of rays until a maximum number of iterations has been reached, and wherein the brightness module is further configured to combine an expected brightness determined at a previous iteration with the brightness value of the stopping point of each ray for a current iteration; and
- a visualization module configured to generate an image that visualizes the three-dimensional dataset based on the expected brightness for each ray.

19. The system of claim 18, wherein the expected brightness for each ray at each iteration is determined as:

$$B_{expected} = B_{prev} + \frac{1}{N}(B_{curr} - B_{prev})$$

where $B_{prev}$ is the expected brightness value for the previous iteration, $B_{curr}$ is the brightness value of the stopping point of the current iteration, and N is the number of iterations performed so far.

* * * * *